United States Patent [19]

Koch et al.

[11] 4,387,108
[45] Jun. 7, 1983

[54] NON-STICK CHEWING GUM COMPOSITION AND METHOD OF PREPARATION

[75] Inventors: Edwin R. Koch, Garden City; Michael Glass, Flushing, both of N.Y.

[73] Assignee: Warner-Lambert Company, Morris Plains, N.J.

[21] Appl. No.: 273,157

[22] Filed: Jun. 12, 1981

[51] Int. Cl.$^3$ .............................................. A23G 3/30
[52] U.S. Cl. ........................................... 426/4; 426/6
[58] Field of Search ......................................... 426/3–6

[56] References Cited

U.S. PATENT DOCUMENTS

| | | | |
|---|---|---|---|
| 3,974,293 | 8/1976 | Witzel | 426/4 |
| 3,984,574 | 10/1976 | Comollo | 426/4 |
| 4,241,090 | 12/1980 | Stroz | 426/4 |

*Primary Examiner*—Jeanette M. Hunter
*Attorney, Agent, or Firm*—Gary M. Nath; Daniel A. Scola

[57] ABSTRACT

A non-adhesive chewing gum base composition demonstrates reduced adhesion, and improved chewing satisfaction, and consists essentially of an elastomer, at least one emulsifier including lecithin, lecithin derivatives, or mixtures thereof in an amount of from 0.5% to 6.0%, an elastomer solvent including the glyceryl ester of partially hydrogenated wood rosin, the latter present in an amount of from about 2.5% to about 8%, as well as one or more mineral adjuvants, a non-toxic vinyl polymer and at least one oleaginous plasticizer. Preferably, the wood rosin elastomer solvent is present in an amount ranging from 2.5 to 5%.

A method for preparing the present chewing gum base composition is also disclosed, which comprises mixing the ingredients of the base composition in one step. Preferably, the elastomer is charged first, and subject to high shear, after which the remaining components are added and shearing is continued. The present invention is more economical, as it eliminates adherence to critical processing parameters.

21 Claims, No Drawings

NON-STICK CHEWING GUM COMPOSITION AND METHOD OF PREPARATION

BACKGROUND OF THE INVENTION

1. Field of the Invention

The present invention relates generally to chewing base compositions, and particularly to non-adhesive chewing gum compositions that do not adhere to dentures, fillings or natural teeth.

2. Description of the Prior Art

Non-adhesive chewing gum compositions have been of continuing interest, as conventional chewing gums tend to adhere to dental surfaces, including natural teeth, fillings and dentures, and have accordingly lessened the enjoyment of chewing the gum. U.S. Pat. No. 3,984,574 discloses purported non-tack chewing gum compositions which claim to reduce adhesion by eliminating certain common base ingredients such as elastomers, resins and waxes that the patentee states causes the gums to be undesirably sticky.

An alternate approach is disclosed in U.S. Pat. No. 2,241,091, where the suggestion is made to add a "slip agent" to a chewing gum base composition to reduce its stickiness.

The prior art proposals require the modification of well known gum base formulations, by either the deletion of certain common ingredients, or the inclusion of other ingredients, in each case requiring adjustment of the gum base to assure the maintenance of desired gum characteristics.

The preparation of the chewing gum base has also been an area in need of improvement. In particular, various techniques have been proposed to modify the combination of the ingredients of the gum base, to improve plasticity and uniformity of the gum base and to thereby improve the quality of the resulting chewing gum. For example, U.S. Pat. No. 4,187,320 discloses a two-stage process for preparing a chewing gum base, that utilizes an initial high shear mixing of the elastomer alone, and thereafter, the elastomer together with its solvent and an oleaginous plasticizer in a first stage, after which the remaining ingredients of the gum base may be combined in specific sequence related to their viscosity. The patent also states that further prior art attempts to improve uniformity have included three-step procedures where certain of the plasticizer ingredients must be added at critical times and under particular conditions, to effect uniform mixing.

It would therefore be desirable to develop a non-adhesive chewing gum base composition that offers an improvement in the reduction of gum stickiness, without the need for substantial or expensive modifications to gum base formulations. It would also be desirable to develop a method for preparing a chewing gum base composition, that yields an improved uniform product without the need for observing intricate or critical process parameters.

SUMMARY OF THE INVENTION

Accordingly, the present invention relates to a non-adhesive chewing gum base composition consisting essentially of the following ingredients, in amounts expressed in percent by weight:

| | |
|---|---|
| Elastomer | 8–30% |
| Oleaginous Plasticizer | 9–40% |
| Mineral Adjuvants | 10–15% |
| Non-toxic Vinyl Polymer | 16–32% |
| Emulsifier | 0.5–10% |
| Elastomer Solvent | 2.5–13% |

Preferably, the elastomer may be selected from polyisobutylene, isobutylene-isoprene copolymers, and mixtures thereof, and the emulsifier may include a material selected from lecithin, lecithin derivatives, and mixtures thereof, in an amount of from 0.5% to 6.0% by weight. The elastomer solvent may comprise the glyceryl ester of partially hydrogenated wood rosin, and may be present in amounts ranging from about 2.5 to 12.5%, and preferably 2.5 to 8% by weight.

A method for preparing a non-adhesive chewing gum base composition is included, which comprises combining all of the ingredients of the base composition and mixing them with each other in one step. Preferably, the ingredients may comprise those set forth above, and the mixing step may be conducted under conditions of high shear, to effect a uniform mixture of the ingredients with each other. The present method requires a critical sequence of ingredient addition, before final combination. The resulting chewing gum base possesses improved uniformity and reduced stickiness, and chewing gums prepared with the present base composition provide a more enjoyable chew.

Accordingly, it is a princial object of the present invention to provide a non-adhesive chewing gum base composition.

It is a further object of the present invention to provide a chewing gum base composition as aforesaid which offers improved uniformity and reduced adhesion without the requirement for formulation modifications.

It is a yet further object of the present invention to provide a method for preparing a non-adhesive chewing gum base composition that yields a favorably uniform composition with a one-step mixing procedure.

Other objects and advantages will become apparent to those skilled in the art from a consideration of the ensuing description.

DETAILED DESCRIPTION

In accordance with the present invention, a non-adhesive chewing gum base composition is prepared which consists essentially of the following ingredients, expressed in percentage by weight:

| | |
|---|---|
| Elastomer | 8–30% |
| Oleaginous Plasticizer | 9–40% |
| Mineral Adjuvants | 10–15% |
| Non-toxic Vinyl Polymer | 16–32% |
| Emulsifier | 0.5–10% |
| Elastomer Solvent | 2.5–13% |

The elastomers useful in the present chewing gum base composition include those elastomers normally employed in gum bases. Accordingly, included elastomers comprise synthetic gums or elastomers such as butadiene-styrene copolymer, polyisobutylene and isobutylene-isoprene copolymers; natural gums or elastomers such as chicle, natural rubber, jelutong, balata, guttapercha, lechi caspi, sorva or mixtures thereof. Among these, isobutylene-isoprene copolymer, polyisobutylene, and mixtures thereof are preferred.

The oleaginous plasticizers useful in accordance with the present invention include fully or partially hydrogenated vegetable oils, such as soybean oil, cottonseed oil, corn oil, peanut oil, and palm oil, as well as hydrogenated or partially hydrogenated animal fats such as tallow or lard. Also, cocoa butter and waxes such as natural waxes, petroleum waxes including the polyethylene waxes, paraffin waxes, and microcrystalline waxes with melting points higher than 80° C., may be utilized individually or in mixtures with each other.

The mineral adjuvants that may be added to the present chewing gum base composition, include materials such as calcium carbonate, magnesium carbonate, alumina, talc, tricalcium phosphate and the like; as well as mixtures thereof.

The present chewing gum base composition may include one or more fatty acids, which, when utilized, may be selected from stearic acid, palmitic acid, oleic acid and the like; and mixtures thereof.

The elastomer solvent may include the terpene resins such as polymers of α-pinene or β-pinene; rosin derivatives including hydrogenated or partially hydrogenated derivatives, such as the glycerol ester of polymerized rosin, alcohol esters of rosin such as the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin and mixtures thereof. Preferably, the glyceryl ester of partially hydrogenated wood rosin may be utilized, and may be present in amounts by weight of the composition ranging from about 2.5% to about 8%, and more preferably, from about 2.5% to about 5% by weight. This ester of wood rosin may be used alone or in admixture with one or more of the other resins, however within the foregoing range of amounts.

The non-toxic vinyl polymers include polyvinyl acetate and its partial hydrolyzate, polyvinyl alcohol, and mixtures thereof. While not critical to the present invention, the vinyl polymer may possess a molecular weight ranging from 3,000 up, and preferably possesses a molecular weight that may range as high as 94,000.

The emulsifiers may be selected from lecithin, glyceryl monostearate, fatty acid monoglycerides, diglycerides and triglycerides, glyceryl triacetate, propylene glycol monstearate, and mixtures thereof.

Preferably, the emulsifier may also include one or more materials selected from lecithin, its derivatives and mixtures thereof, in amounts of from 0.5% to about 6.0% by weight. The lecithin derivatives more preferably comprise hydroxylated lecithin, and the lecithin materials may be present in an amount of from 0.5% to 4% by weight.

The present chewing gum base composition may also include conventional additives such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included.

More particularly, the non-adhesive chewing gum base composition consists essentially of, in weight percent, an elastomer in an amount of from about 8% to about 30% selected from butadiene-styrene copolymers, polyisobutylene, isobutylene-isoprene, and mixtures thereof; at least one oleaginous plasticizer in an amount of from 9% to about 40%; at least one mineral adjuvant present in an amount of from 10% to 15%, a non-toxic vinyl polymer selected from polyvinyl alcohol, polyvinyl acetate, and mixtures thereof, present in an amount of from 15% to 32%; at least one emulsifier present in an amount of from 0.5 to 10% including at least one material selected from lecithin, lecithin derivatives, and mixtures thereof, in an amount of from about 0.5% to about 6.0%; and an elastomer solvent in an amount of from 2.5% to about 12.5%, including the glyceryl ester of partially hydrogenated wood rosin in an amount of from about 2.5% to about 8%.

More preferably, the present chewing gum base composition may contain an elastomer selected from polyisobutylene, isobutylene-isoprene copolymers, and mixtures thereof; the emulsifier may include lecithin, hydroxylated lecithin, and mixtures thereof in an amount ranging from 0.5% to about 4.0%; and the elastomer solvent may include the glyceryl ester of partially hydrogenated wood rosin in an amount of from 2.5% to 5%.

In a further embodiment of the present invention, a method for preparing the chewing gum base composition comprises combining the foregoing ingredients with each other in one step, preferably under agitation, and particularly by means of high shear mixing such as disclosed in U.S. Pat. No. 4,187,320, incorporated herein by reference. By contrast with the overall method of the referenced patent, however, the ingredients of the present chewing gum base composition need not be combined in separate mixing stages, but can be charged into a single location for mixing.

The exact sequence of ingredient addition is critical, and it is preferable to commence the present method by adding the desired quantity of the elastomer and placing the elastomer so added under shear to effect its softening. Thereafter, the elastomer solvent may be added and continued shearing action maintained. Further ingredients, such as the oleaginous plasticizers, the non-toxic vinyl polymer and the emulsifiers may be thereafter added under continued high shear to formulate the final base composition.

The non-toxic vinyl polymer utilized in the present invention may vary in molecular weight, and may preferably possess a molecular weight ranging from about 3,000 to about 94,000, including molecular weights on the order of 10,000 to 40,000, as well as 50,000 to 75,000.

In a preferred embodiment of the present method, the elastomer is initially subjected to high shear mixing, after which the elastomer solvent may be added thereto in stepwise fashion under continued high shear. Subsequently, the oleaginous plasticizer components may be added in similar stepwise fashion with continued high shear, after which the remaining ingredients of the chewing gum base composition may be added sequentially. Thus, the emulsifier, the non-toxic vinyl polymer and the mineral adjuvants are then added, and may, in one embodiment, be added in sequence determined by the decreasing order of their viscosity. In accordance with the present invention, the one-step addition of the ingredients results in the preparation of a suitably uniform gum base composition.

Naturally, the foregoing details of the present method are presented for purposes of illustration, and to provide a best mode for the practice of the invention, and therefore the invention should not be limited to the parameters set forth above.

The following examples represent illustrative formulations of chewing gum base compositions in accordance with the present invention.

EXAMPLE I

A chewing gum base composition was prepared with the following ingredients, in amounts expressed as percent by weight of the total composition.

|  | Weight Percent |
| --- | --- |
| Isobutylene-Isoprene Copolymer | 8.82% |
| Polyisobutylene | 20.15% |
| Hydrogenated Vegetable Oil | 36.83% |
| Hydroxylated Lecithin | 3.60% |
| Calcium Carbonate | 10.20% |
| Polyvinyl Acetate | 16.20% |
| Glyceryl Monostearate | 1.70% |
| Glyceryl Ester of Partially Hydrogenated Wood Rosin | 2.50% |

The foregoing ingredients were prepared in accordance with the present method by the initial shear mixing of the components of the elastomer, followed by the addition of the remaining ingredients in metered fashion thereto.

In similar fashion, the following formulations were prepared, and their specific ingredients, and respective amounts expressed in weight percent, are set forth below.

EXAMPLE II

|  | Weight Percent |
| --- | --- |
| Butadiene-Styrene Copolymer | 8.29% |
| Hydrogenated Vegetable Oil | 8.19% |
| Lecithin | 0.82% |
| Calcium Carbonate | 14.88% |
| Polyvinyl Acetate | 30.95% |
| Glyceryl Monostearate | 5.85% |
| Glycerol Ester of Polymerized Rosin | 7.45% |
| Glyceryl Ester of Partially Hydrogenated Wood Rosin | 4.76% |
| Paraffin Wax | 8.72% |
| Microcrystalline Wax | 10.00 |

EXAMPLE III

|  | Weight Percent |
| --- | --- |
| Isobutylene-Isoprene Copolymer | 4.41% |
| Polyisobutylene | 10.08% |
| Butadiene-Styrene Copolymer | 4.15% |
| Hydrogenated Vegetable Oil | 22.52% |
| Hydroxylated Lecithin | 1.80% |
| Lecithin | 0.41% |
| Calcium Carbonate | 12.55% |
| Polyvinyl Acetate | 23.59% |
| Glyceryl Monostearate | 3.78% |
| Glycerol Ester of Polymerized Resin | 3.73% |
| Glyceryl Ester of Partially Hydrogenated Wood Rosin | 3.63% |
| Paraffin Wax | 4.36% |
| Microcrystalline Wax | 5.00% |

From the above examples, it is apparent that a variety of ingredients may be added to the present chewing gum base compositions, without limitation. In particular, elastomers, their solvents comprising the resins and rosins, and waxes may be added together, in contradiction to the teachings of the prior art, with the result that a non-adhesive base composition is obtained. Thus, neither the critical omission of certain of these ingredients, nor the specific combination of these ingredients with each other is necessary. The resulting chewing gum base yields a chewing gum that possesses the qualities desirable for chewing enjoyment as indicated by panel testing presented later on herein.

The present chewing gum base composition may be formulated into a variety of chewing gum products utilizing standard procedures and equipment. Thus, a chewing gum may be prepared by combining additional ingredients, such as sweeteners, flavorings, softeners, fillers, colorants and the like.

The gum base may vary in amount from about 15 to about 40% by weight of the final chewing gum, and preferably from about 20 to about 30% by weight.

In addition to the ingredients listed above, plasticizers or softeners such as lanolin, propylene glycol, glycerol and the like and mixtures of these, may be optionally incorporated within the present gum base composition to achieve desired texture and consistency.

The present compositions may include fillers, such as calcium carbonate, magnesium carbonate, talc and the like, already mentioned as mineral adjuvants.

Additionally, thickeners may be employed herein alone or in conjunction with other softeners, and may include methyl cellulose, alginates, carrageenan, xanthan gum, gelatin, carob, tragacanth, locust bean, and carboxymethyl cellulose.

The chewing gum also may include a sweetener, which, in the instance of sugar sweetened gum, comprises sugar, including sucrose, glucose (corn syrup), dextrose, invert sugar, fructose, and mixtures thereof. In the instance where a sugarless gum is prepared, the sweetener comprises a sugar substitute, including saccharin and its various salts such as the sodium or calcium salts, cyclamic acis and its various salts such as the sodium salt, the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also, the nonfermentable sugar substitute (hydrogenated starch hydrolysate) described in U.S. Reissue Patent No. 26,959, may be utilized, as well as the synthtic sweetener 3,4-dihydro-6-methyl-1,2,3-oxathiazin-4-one-2,2-dioxide, including its potassium, sodium and calcium salts, all described in German Patent No. 2,001,017.7. Any of the foregoing sweeteners may be present alone or in combination with each other, within the scope of the present invention.

Useful flavors include the essential oils or synthetic flavors or mixtures thereof. Flavors include artificial and synthetic fruit flavors, cinnamon, spearmint, peppermint, birch, anise, and the like, with natural fruit flavors derived from essence of fruits such as apple, pear, peach, strawberry, apricot, orange, watermelon, banana and the like. Generally, the flavors account for up to about 1% by weight of the total composition.

Additional materials may be included in the present chewing gum composition, such as corn syrup, sugar alcohols, such as sorbitol, mannitol, xylitol, as well as materials such as hydrolyzed cereal solids, which may be provided as bulking agents, as well as sweeteners.

The present chewing gum may be prepared in stick shape and cube shape, as well as in the center-filled conformation. The techniques for the preparation of chewing gums in these configurations are known in the art, and do not, per se, form a part of the present invention.

In order to evaluate the adhesive characteristics of chewing gums prepared with the chewing gum base of the present invention, representative chewing gum gum compositions were formulated and were evaluated by human panel testing, as will be subsequently explained.

The subjects reported to the testing location where they were familiarized with the procedure, and the evaluation scale was explained to them. Each panel tested three chewing gum formulations, and individual panel members were assigned to one of the formulations according to a random code.

The panel members were instructed to chew the gum until it became soft in the mouth, at which point they were to make their evaluations as to stickiness. Each panel member made further evaluations of the gum sample at subsequent intervals of 5 and 15 minutes after the start of the test, respectively. The degree of stickiness was evaluated utilizing the following scale.

A rating of 1 indicated that the gum did not stick at all. A rating of 2 indicated that the gum stuck slightly. A rating of 3 indicated that the gum stuck moderately, and the rating of 4 indicated that the gum stuck severely. Thus, three such subjective evaluations were gathered from each panel member regarding each gum sample.

The results of the three series of comparative tests are set forth in Tables I, II and III below.

TABLE I

CHEWING GUM ADHESIVENESS RATINGS

| TIME | RATING NO. | GUM A (Peppermint + Glycerin) NO. | % | GUM B (Peppermint − No Glycerin) NO. | % | GUM C (Competitive Peppermint) NO. | % |
|---|---|---|---|---|---|---|---|
| Upon Softening | 1 | 44 | 100.0 | 44 | 100.0 | 44 | 100.0 |
| | 2 | 0 | 0.0 | 0 | 0.0 | 0 | 0.0 |
| | 3 | 0 | 0.0 | 0 | 0.0 | 0 | 0.0 |
| | 4 | 0 | 0.0 | 0 | 0.0 | 0 | 0.0 |
| 5 min. | 1 | 43 | 97.7 | 44 | 100.0 | 44 | 100.0 |
| | 2 | 1 | 2.3 | 0 | 0.0 | 0 | 0.0 |
| | 3 | 0 | 0.0 | 0 | 0.0 | 0 | 0.0 |
| | 4 | 0 | 0.0 | 0 | 0.0 | 0 | 0.0 |
| 15 min. | 1 | 41 | 93.2 | 42 | 95.5 | 44 | 100.0 |
| | 2 | 3 | 6.8 | 2 | 4.5 | 0 | 0.0 |
| | 3 | 0 | 0.0 | 0 | 0.0 | 0 | 0.0 |
| | 4 | 0 | 0.0 | 0 | 0.0 | 0 | 0.0 |

TABLE II

CHEWING GUM ADHESIVENESS RATINGS

| TIME | RATING NO. | GUM D (Spearmint + Glycerin) NO. | % | GUM E (Spearmint − No Glycerin) NO. | % | GUM F (Competitive Spearmint) NO. | % |
|---|---|---|---|---|---|---|---|
| Upon Softening | 1 | 43 | 97.7 | 44 | 100.0 | 44 | 100.0 |
| | 2 | 1 | 2.3 | 0 | 0.0 | 0 | 0.0 |
| | 3 | 0 | 0.0 | 0 | 0.0 | 0 | 0.0 |
| | 4 | 0 | 0.0 | 0 | 0.0 | 0 | 0.0 |
| 5 min. | 1 | 43 | 97.7 | 44 | 100.0 | 44 | 100.0 |
| | 2 | 1 | 2.3 | 0 | 0.0 | 0 | 0.0 |
| | 3 | 0 | 0.0 | 0 | 0.0 | 0 | 0.0 |
| | 4 | 0 | 0.0 | 0 | 0.0 | 0 | 0.0 |
| 15 min. | 1 | 44 | 100.0 | 44 | 100.0 | 43 | 97.7 |
| | 2 | 0 | 0.0 | 0 | 0.0 | 1 | 2.3 |
| | 3 | 0 | 0.0 | 0 | 0.0 | 0 | 0.0 |
| | 4 | 0 | 0.0 | 0 | 0.0 | 0 | 0.0 |

TABLE III

CHEWING GUM ADHESIVENESS RATINGS

| TIME | RATING NO. | GUM G (Cinnamon + Glycerin) NO. | % | GUM H (Cinnamon − No Glycerin) NO. | % | GUM I (Competitive Cinnamon) NO. | % |
|---|---|---|---|---|---|---|---|
| Upon Softening | 1 | 44 | 100.0 | 44 | 100.0 | 42 | 95.5 |
| | 2 | 0 | 0.0 | 0 | 0.0 | 2 | 4.5 |
| | 3 | 0 | 0.0 | 0 | 0.0 | 0 | 0.0 |
| | 4 | 0 | 0.0 | 0 | 0.0 | 0 | 0.0 |
| 5 min. | 1 | 43 | 97.7 | 43 | 97.7 | 44 | 100.0 |
| | 2 | 1 | 2.3 | 1 | 2.3 | 0 | 0.0 |
| | 3 | 0 | 0.0 | 0 | 0.0 | 0 | 0.0 |
| | 4 | 0 | 0.0 | 0 | 0.0 | 0 | 0.0 |
| 15 min. | 1 | 33 | 84.5 | 43 | 100.0 | 44 | 100.0 |
| | 2 | 4 | 10.3 | 0 | 0.0 | 0 | 0.0 |
| | 3 | 1 | 2.6 | 0 | 0.0 | 0 | 0.0 |
| | 4 | 1 | 2.6 | 0 | 0.0 | 0 | 0.0 |

A review of the above tables indicates that, for the most part, the chewing gums utilizing bases of the present invention were at least comparable in subjectively perceived adhesiveness to that of the competitive gum, which as noted earlier achieved improvement in reduction of adhesiveness by the deletion of certain ingredients from the gum base.

The results of Table III with respect to the cinnamon gum samples, is somewhat inconclusive, as five of the Gum G samples and one of the Gum H samples crumbled after 6 to 10 minutes of chewing. The remaining samples, however, performed in comparable fashion to those of the competitive gum.

After the tests were completed, the dentures of the panel members were examined by a dentist, and, in each instance, were found to be free of any gum residues.

The panel members participating in the above tests that completed 15 minutes of chewing, and experienced only moderate sticking or less, were asked to render overall ratings of the gum sample on the basis of the following scale.

A rating of 1 indicated that the panel member would definitely want to chew the particular gum. A rating of 2 indicated that the panel member would probably chew the gum. A rating of 3 indicated that the panel member probably would not chew the gum, and a rating of 4 indicated that the panel member definitely would not chew the gum. The data from this additional evaluation is set forth in Tables IV, V and VI, below.

TABLE IV

CHEWING GUM PREFERENCE RATING RESULTS

| RATING NO. | GUM A (Peppermint + Glycerin) NO. | % | GUM B (Peppermint − No Glycerin) NO. | % | GUM C (Competitive Peppermint) NO. | % |
|---|---|---|---|---|---|---|
| 1 | 23 | 52.3 | 22 | 50.0 | 10 | 22.8 |
| 2 | 16 | 36.4 | 18 | 40.9 | 22 | 50.0 |
| 3 | 3 | 6.8 | 4 | 9.1 | 6 | 13.6 |
| 4 | 2 | 4.5 | 0 | 0.0 | 6 | 13.6 |

TABLE V

CHEWING GUM PREFERENCE RATING RESULTS

| RATING NO. | GUM D (Spearmint + Glycerin) NO. | % | GUM E (Spearmint — No Glycerin) NO. | % | GUM F (Competitive Spearmint) NO. | % |
|---|---|---|---|---|---|---|
| 1 | 16 | 36.4 | 13 | 29.5 | 14 | 31.8 |
| 2 | 23 | 52.2 | 26 | 59.1 | 23 | 52.3 |
| 3 | 4 | 9.1 | 4 | 9.1 | 4 | 9.1 |
| 4 | 1 | 2.3 | 1 | 2.3 | 3 | 6.8 |

TABLE VI

CHEWING GUM PREFERENCE RATING RESULTS

| RATING NO. | GUM G (Cinnamon + Glycerin) NO. | % | GUM H (Cinnamon — No Glycerin) NO. | % | GUM I (Competitive Cinnamon) NO. | % |
|---|---|---|---|---|---|---|
| 1 | 6 | 13.9 | 10 | 22.7 | 14 | 31.8 |
| 2 | 10 | 23.2 | 19 | 43.2 | 19 | 43.2 |
| 3 | 10 | 23.2 | 10 | 22.7 | 5 | 11.4 |
| 4 | 17 | 39.7 | 5 | 11.4 | 6 | 13.6 |

The results of Tables IV and V suggest that the gums prepared in accordance with the present invention were apparently more enjoyable to the panel members, as greater numbers of the members questioned indicated that they would either definitely want to chew or probably chew the respective gums. Only the results of Table VI, reflecting the instance where several of the gums crumbled during the test, indicates the panel member's dissatisfaction with the gums of the present invention, and this data is reflective of the number of gum breakdowns that occurred with the respective gum formulations.

Generally, however, the results of the last ratings suggests that the gums prepared in accordance with the present invention were more desirable on a flavor-by-flavor basis than the non-adhesive chewing gum of the current prior art. This suggests that certain desirable qualities exist in the present chewing gums, such as uniformity, plasticity and the like, that may be attributed to the preparation of the chewing gum base.

This invention may be embodied in other forms or carried out in other ways without departing from the spirit or essential characteristics thereof. The present invention is therefore to be considered as in all respects illustrative and not restrictive, the scope of the invention being indicated by the appended claims, and all changes which come within the meaning and range of equivalency are intended to be embraced therein.

What is claimed is:

1. A non-adhesive chewing gum base composition, comprising, in weight percent:
(a) Elastomer in the amount of about 8 to about 30%, said elastomer selected from the group consisting of synthetic gums, synthetic elastomers, natural gums and natural elastomers,
(b) Oleaginous plasticizer in the amount of about 9 to about 40%,
(c) Mineral adjuvants in the amount of about 10 to about 15%, said mineral adjuvants selected from a group consisting of calcium carbonate, magnesium carbonate, alumina, talc, tricalcium phosphate and mixtures thereof,
(d) Non-toxic vinyl polymers in the amount of about 16 to about 32%,
(e) Emulsifier in the amount of about 0.5 to about 10%,
(f) Elastomer solvent in the amount of about 2.50 to about 8%, said solvent selected from the group consisting of terpene resins, hydrogenated rosin derivatives, partially hydrogenated rosin derivatives, alcohol esters of rosin and mixtures thereof.

2. The composition of claim 1 wherein said synthetic elastomer or gum is selected from the group consisting of butadiene-styrene copolymers, polyisobutylene, isobutylene-isoprene copolymers and mixtures thereof.

3. The composition of claim 1 wherein said emulsifier includes at least one material selected from lecithin, lecithin derivatives, and mixtures thereof, in an amount of from about 0.5% to about 6.0%.

4. The composition of claim 3 wherein said lecithin derivatives comprise hydroxylated lecithin.

5. The composition of claims 3 or 4, wherein said material is present in an amount of from 0.5% to 4.0%.

6. The composition of claim 1 wherein said oleaginous plasticizer is selected from hydrogenated vegetable oils, partially hydrogenated vegetable oils, hydrogenated animal fats, partially hydrogenated animal fats, cocoa butter, waxes, and mixtures thereof.

7. The composition of claim 6 wherein said vegetable oils are selected from soybean oil, cottonseed oil, corn oil, peanut oil, palm oil and mixtures thereof;
said animal fats are selected from tallow, lard and mixtures thereof; and
said waxes are selected from natural waxes, petroleum waxes, paraffin waxes, microcrystalline waxes and mixtures thereof.

8. The composition of claim 1 wherein said non-toxic vinyl polymer is selected from polyvinyl alcohol, polyvinyl acetate, and mixtures thereof.

9. The composition of claim 1 wherein said emulsifier is present in an amount of from 1.5% to 6%.

10. The composition of claims 1 or 9 wherein said emulsifier is selected from lecithin, glyceryl monostearate, fatty acid monoglycerides, diglycerides and triglycerides, glyceryl triacetate, propylene glycol monostearate, and mixtures thereof.

11. The composition of claim 1, wherein said elastomer solvent is selected from terpene resins, hydrogenated rosin derivatives, partially hydrogenated rosin derivatives, alcohol esters of rosin and mixtures thereof.

12. The composition of claim 11 wherein said elastomer solvent is selected from α-pinene, β-pinene, the glycerol ester of polymerized rosin, the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of partially hydrogenated wood rosin, the glyceryl ester of rosin, and mixtures thereof.

13. The composition of claim 12 wherein said elastomer solvent comprises the glyceryl ester of partially hydrogenated wood rosin.

14. A non-adhesive chewing gum base composition consisting essentially of, in weight percent:
from about 8% to about 30% of an elastomer selected from polyisobutylene, isobutylene-isoprene copolymers, and mixtures thereof;
from 9 to 40% of an oleaginous plasticizer selected from the hydrogenated vegetable oils, partially hydrogenated vegetable oils, hydrogenated animal fats, partially hydrogenated animal fats, cocoa butter, waxes, and mixtures thereof;

from about 10% to about 15% of at least one mineral adjuvant selected from calcium carbonate, magnesium carbonate, alumina, talc, tricalcium phosphate, and mixtures thereof;

from 16% to 32% of a non-toxic vinyl polymer selected from polyvinyl alcohol, polyvinyl acetate, and mixtures thereof;

from 0.5% to 6.0% of at least one emulsifier selected from lecithin, hydrogenated lecithin, glyceryl monostearate, fatty acid monoglycerides, diglycerides and triglycerides, glyceryl triacetate, propylene glycol monostearate, and mixtures thereof; and from 2.5% to about 12.5% of an elastomer solvent selected from terpene resins, hydrogenated rosin derivatives, partially hydrogenated rosin derivatives, alcohol esters of rosin, and mixtures thereof, said elastomer including the glyceryl ester of partially hydrogenated wood rosin in amount of from 2.5% to 5.0%.

15. A method for preparing a non-adhesive chewing gum base composition, said method comprising:
A. providing for the following ingredients, in amounts expressed in percent by weight:
   (a) from about 8% to about 30% of an elastomer selected from the group consisting of synthetic gums, synthetic elastomers, natural gums and natural elastomers;
   (b) From about 9% to about 40% of an oleaginous plasticizer;
   (c) from about 10% to about 15% of at least one mineral adjuvant selected from the group consisting of calcium carbonate, magnesium carbonate, alumina, talc, tricalcium phosphate and mixtures thereof;
   (d) from about 16% to about 32% of a non-toxic vinyl polymer;
   (e) from about 0.5% to about 10% of at least one emulsifier;
   (f) from about 2.5% to about 8% of an elastomer solvent selected from the group consisting of terpene resins, hydrogenated rosin derivatives, partially hydrogenated rosin derivatives, alcohol esters of rosin and mixtures thereof;
B. First agitating said elastomer by high shear mixing;
C. Adding said elastomer solvent to the elastomer of step B to form a first mixture; and
D. Adding to said mixture, the remainder of said ingredients;
E. Wherein all of said ingredients are mixed with each other under agitation.

16. The method of claim 15 wherein said ingredients are added sequentially with respect to each other.

17. The method of claim 16 wherein all of said ingredients are mixed under shearing action.

18. The method of claim 15 wherein, following the addition of said elastomer solvent, at least a portion of said oleaginous plasticizer is mixed therewith.

19. The method of claim 15 wherein said oleaginous plasticizer, said elastomer solvent and said elastomer are subjected to high shearing.

20. The composition of claim 1 wherein the natural gums and elastomers are selected from the group consisting of chicle, jelutong, balata, gutta-percha, lechi caspi, sorva, and mixtures thereof.

21. The composition of claim 1 wherein the synthetic elastomer or gum is selected from the group consisting of butadiene-styrene copolymers, polyisobutylene, isobutylene-isoprene copolymers and mixtures thereof.

* * * * *